United States Patent [19]

Ikeda

[11] Patent Number: 4,638,784
[45] Date of Patent: Jan. 27, 1987

[54] METHOD OF AND APPARATUS FOR CONTROLLING VACUUM MODULATING VALVE FOR EXHAUST GAS RECIRCULATION CONTROL

[75] Inventor: Shinji Ikeda, Toyota, Japan

[73] Assignee: Toyota Jidosha Kabushiki Kaisha, Toyota, Japan

[21] Appl. No.: 754,161

[22] Filed: Jul. 12, 1985

[30] Foreign Application Priority Data

Jul. 16, 1984 [JP] Japan ................................ 59-147139

[51] Int. Cl.⁴ .............................................. F02M 25/06
[52] U.S. Cl. ..................................... 123/571; 123/569; 361/165
[58] Field of Search ................ 123/568, 569, 571, 480, 123/478; 137/468, 625.64; 251/129.15; 361/106, 152, 154, 165

[56] References Cited

U.S. PATENT DOCUMENTS

| | | | |
|---|---|---|---|
| 4,219,861 | 8/1980 | Wiegand | 361/165 X |
| 4,309,759 | 1/1982 | Tokuda et al. | 123/480 X |
| 4,388,912 | 6/1983 | Kimura et al. | 123/571 X |
| 4,445,489 | 5/1984 | Kobayashi et al. | 123/571 |
| 4,461,263 | 7/1984 | Hasegawa | 123/480 X |
| 4,494,559 | 1/1985 | Kawamura | 123/571 X |
| 4,495,929 | 1/1985 | Maeda et al. | 123/569 |
| 4,541,398 | 9/1985 | Kishi | 123/571 |

FOREIGN PATENT DOCUMENTS 0067954 4/1983 Japan .

Primary Examiner—Willis R. Wolfe, Jr.
Attorney, Agent, or Firm—Parkhurst & Oliff

[57] ABSTRACT

In controlling a vacuum modulating valve for EGR control, incorporating therein a temperature detecting element, a required drive signal of the vacuum modulating valve, which is obtained in accordance with operating conditions of an engine including an engine speed and an engine load is two-dimensionally corrected in accordance with at least a temperature of the vacuum modulating valve, which is detected by the temperature detecting element, and a driving level of the required drive signal, so that temperature compensation with high accuracy is performed with no use of a current feedback circuit.

9 Claims, 10 Drawing Figures

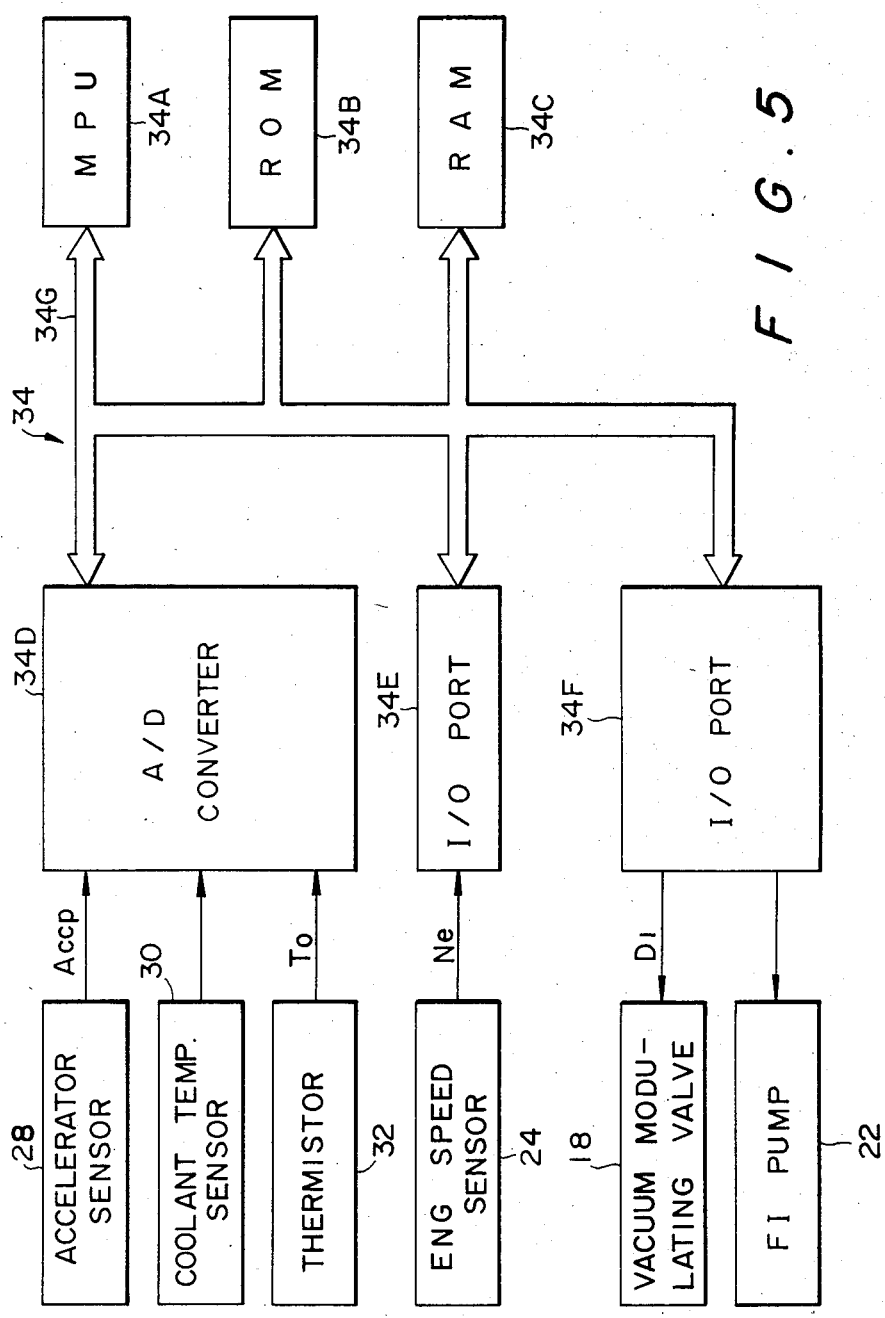

4,638,784

METHOD OF AND APPARATUS FOR CONTROLLING VACUUM MODULATING VALVE FOR EXHAUST GAS RECIRCULATION CONTROL

BACKGROUND OF THE INVENTION

1. Field of the Invention

This invention relates to a method of and an apparatus for controlling a vacuum modulating valve for the exhaust gas recirculation control, and more particularly to improvements in a method of and an apparatus for controlling a vacuum modulating valve for the exhaust gas recirculation control, incorporating therein a temperature detecting element, suitable for use in an exhaust gas recirculation system (hereinafter referred to as an "EGR system") in an electronically controlled diesel engine for a motor vehicle.

2. Description of the Prior Art

In Japanese Patent Laid-Open No. 67954/1983, for example, there has been proposed such a technique that there is provided a vacuum modulating valve for modulating the control vacuum of an exhaust gas recirculation value control valve (hereinafter referred to as an "EGR valve") in order to control the exhaust gas recirculation (hereinafter referrd to as "EGR") in a diesel engine, particularly in a diesel engine for a motor vehicle. An electric signal commensurate to the operating conditions of the engine is applied to a solenoid of the vacuum modulating valve, whereby the control vacuum supplied to a diaphragm chamber of the EGR valve is made to be a value such that a predetermined exhaust gas recirculation rate (hereinafter referred to as an "EGR rate") commensurate to the operating conditions of the engine can be obtained.

According to this conventional technique, a duty ratio is calculated from the predetermined EGR rate, and a signal of the duty ratio is applied to the solenoid of the vacuum modulating valve. Because of this, a normal EGR rate characteristic suited to the operating conditions of the engine can be obtained. In this case, the provision of a feedback circuit for causing a coil current to be constant for the temperature compensation of the solenoid makes it possible to avoid a shift of the EGR rate if heat is generated by the actuation of the solenoid. However, integrated circuits (hereinafter referred to as "IC") are in needed in number due to the current feedback circuit, thus presenting the disadvantages of increased number of parts and raised cost.

On the other hand, to solve the above-described disadvantages, the applicant has proposed in Japanese Patent Application No. 66672/1984, that a temperature detecting element such as a thermistor is incorporated in the vacuum modulating valve, and a required drive signal of the vacuum modulating valve is calculated in a temperature compensating manner by a temperature signal from the temperature detecting element, whereby the temperature compensation of the current flowing through a coil in the vacuum modulating valve is conducted with no use of a current feedback circuit.

However, according to the aforesaid senior application, the drive signal of the vacuum modulating valve is corrected only by a temperature outputted from the thermistor. Therefore, if this correction is not satisfactory, the coil current is not accurately corrected, the vacuum modulating characteristics of the vacuum modulating valve is shifted from the required characteristic and the EGR value is shifted from the requirement, thus possibly causing lowered output power of the engine, generation of white smoke or smoke, deteriorated exhaust emission and the like.

SUMMARY OF THE INVENTION

The present invention has been developed to obviate the disadvantages of the prior art and has as its object the provision of a method of and an apparatus for controlling a vacuum modulating valve for the EGR control, wherein temperature correction with high accuracy can be performed with no use of a current feedback circuit.

To the above end, the present invention contemplates that, in a method of controlling a vacuum modulating valve for EGR control, incorporating therein a temperature detecting element, as the gist thereof is shown in FIG. 1, the method comprises:

a step of determining a required drive signal of the vacuum modulating valve in accordance with operating conditions of an engine, including an engine speed and an engine load;

a step of correcting the required drive signal in accordance with at least a temperature of the vacuum modulating valve detected by the temperature detecting element and a driving level of the required drive signal; and a step of driving the vacuum modulating valve in response to the drive signal after the correction.

A specified form of the present invention is of such an arrangement that the required drive signal is corrected such that, firstly, the detected temperature of the vacuum modulating valve is corrected by the driving level of the required drive signal, and subsequently, the required drive signal is corrected by the temperature after the correction and a battery voltage, so that a fine correction of the required drive signal can be reliably performed in accordance with the temperature of the vacuum modulating valve, the driving level of the required drive signal and the battery voltage.

To the above end, the present invention contemplates that, in an apparatus for controlling a vacuum modulating valve for EGR control, incorporating therein a temperature detecting element, the apparatus comprises:

means for detecting an engine speed;

means for detecting an engine load;

means for determining a required drive signal of the vacuum modulating valve in accordance with operating conditions of an engine, including the engine speed and the engine load;

means for correcting the required drive signal in accordance with a temperature of the vacuum modulating valve detected by the temperature detecting element, a battery voltage and a driving level of the required drive signal; and means for driving the vacuum modulating valve in response to the drive signal after the correction.

According to the present invention, the required drive signal of the vacuum modulating valve for EGR control, which is determined in accordance with the operating conditions of the engine including the engine speed and the engine load, is two-dimensionally corrected at least by the temperature of the vacuum modulating valve detected by the temperature detecting element and the driving level of the required drive signal, so that the temperature compensation with high accuracy can be performed with no use of a current feedback circuit. In consequence, the EGR value can be controlled with high accuracy, and the lowered engine output power, generation of white smoke shirt of the EGR value from the required value can be avoided or smoke, deteriorated exhaust emission and the like due to the

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 5 is a block diagram showing the arrangement of the electronic control unit used in the above embodiment;

DETAILED DESCRIPTION OF THE INVENTION

Detailed description will hereunder be given of one embodiment of the EGR system in the electronically controlled diesel engine for a motor vehicle, to which is applied the present invnetion, with reference to the drawings.

Figure 1:
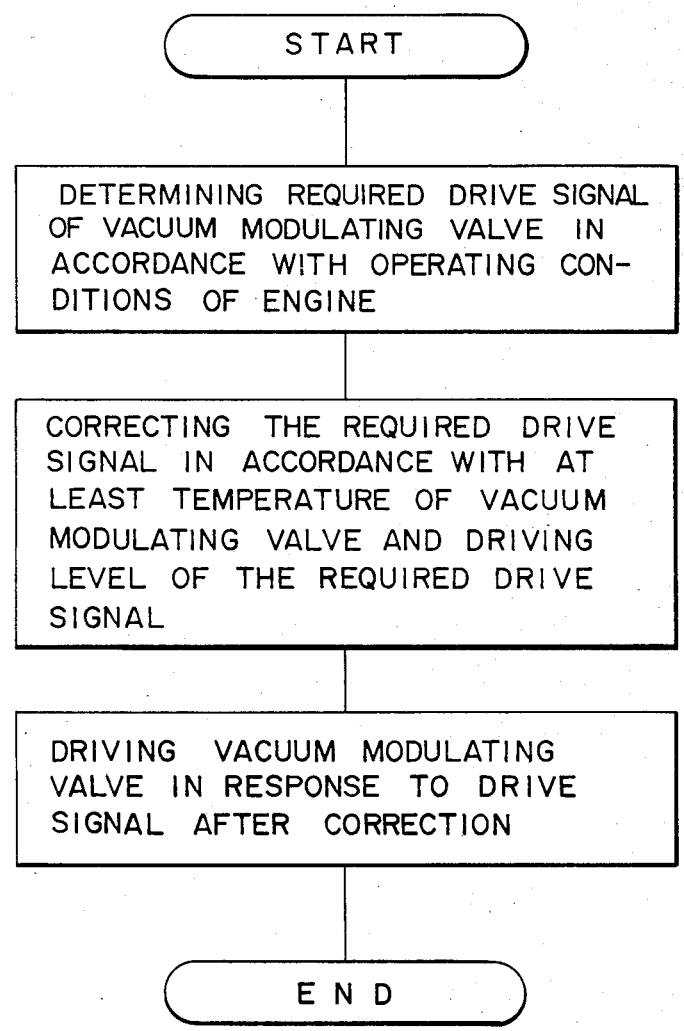
FIG. 1 is a flow chart showing the gist of the method of controlling the vacuum modulating valve for the EGR control according to the present invention.
Figure 2:
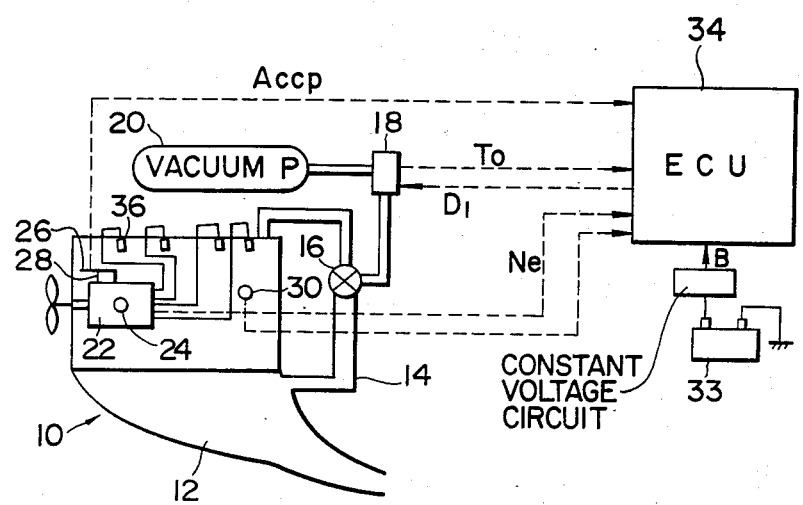
FIG. 2 is a front view showing the arrangement of an embodiment of the EGR system of the electronically controlled diesel engine for a motor vehicle, to which is applied the present invention, partially including a drawing of a pipeline and a block diagram.

As detailedly shown in FIG. 2, the EGR system in this embodiment comprises:

an exhaust gas recirculation passage (hereinafter referred to as an "EGR passage") 14 introducing part of the exhaust gas discharged into an exhaust manifold 12 of a diesel engine 10 to an engine intake system;

an EGR valve 16 for controlling an exhaust gas flow-rate flowing through the EGR passage 14;

a vacuum modulating valve 18, to which is applied the present invention, for controlling the operation of the EGR valve 16;

a vacuum pump 20 as being the vacuum source of the vacuum modulating valve 18;

an engine speed sensor 24 provided on a fuel injection pump 22, for detecting an engine speed Ne from the rotation of a driving shaft of the pump;

an accelerator sensor 28 for detecting an opening of an accelerator lever 26 i.e. an accelerator opening Accp, interlocked with an accelerator pedal, not shown, provided in a driver's seat, to control the fuel injection pump 22;

a coolant temperature sensor 30 for detecting an engine coolant temperature;

a thermistor 32 (FIG. 4) incorporated in the vacuum modulating valve 18, for detecting a temperature $T_0$ of the coil thereof;

a battery 33; and an electronic control unit (hereinafter referred to as an "ECU") 34 for determining a required duty ratio $D_0$ of the vacuum modulating valve 18 in accordance with the operating conditions of the engine including the engine speed Ne detected from an output of the engine speed sensor 24 and the accelerator opening Accp (engine load) detected from an output of the accelerator sensor 26, correcting the required duty ratio $D_0$ in accordance with the coil temperature $T_0$ of the vacuum modulating valve 18 detected by the thermistor 32, the required duty ratio $D_0$ and a voltage B of the battery 33 and outputting an output duty signal $D_1$ after the correction to the vacuum modulating valve 18.

Referring to the drawings, designated at 36 are injectors for injecting fuel under high pressure generated in the injection pump 22 into respective cylinders of the diesel engine 10.

Figure 3:
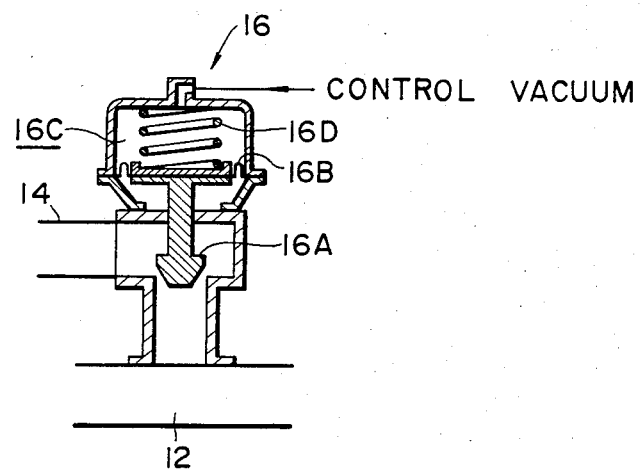
FIG. 3 is a sectional view showing the arrangement of the EGR valve used in the above embodiment.

As detailedly shown in FIG. 3, the EGR valve 16 comprises:

a valve body 16A adapted to move vertically in the drawing to control an opening area of the EGR passage 14;

a diaphragm 16B for driving the valve body 16A vertically in the drawing;

a diaphragm chamber 16C defined by the diaphragm 16B; and a compression spring 16D modulated in the diaphragm chamber 16C, for biasing the valve body 16A in the closing direction of the valve.

In consequence, the control vacuum modulated by the vacuum modulating valve 18 is introduced into the diaphragm chamber 16C, whereby a lift of the valve body 16A, i.e. the EGR ratio is varied in accordance with the control vacuum.

Figure 4:
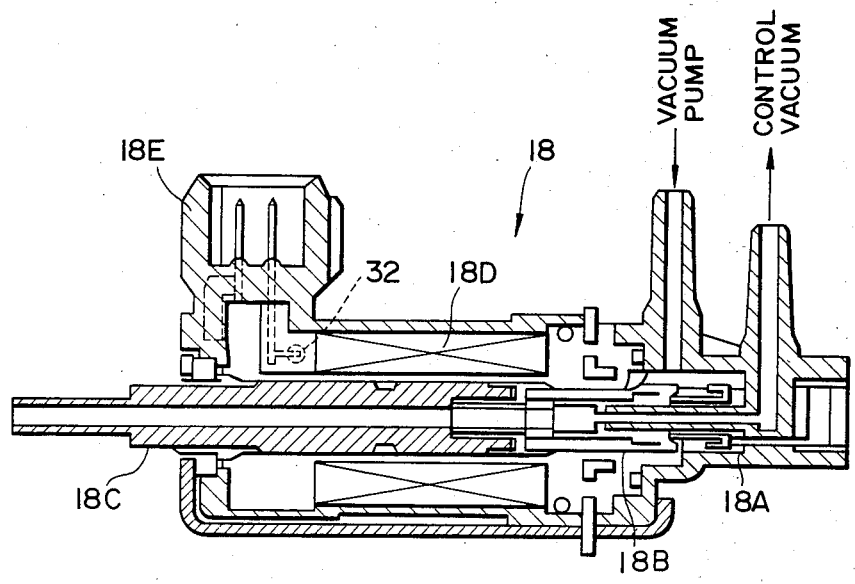
FIG. 4 is a sectional view showing the arrangement of the vacuum modulating valve incorporating therein a thermistor used in the above embodiment.

As detailedly shown in FIG. 4, the vacuum modulating valve 18 comprises:

a casing 18A;

a piston 18B slidably coupled into the casing 18A;

a plunger 18C for driving the piston 18B;

a coil 18D for attracting the plunger 18C during current passing; and a connector 18E for feeding a driving current to the coil 18D.

In consequence, the current passed to the coil 18D is controlled, whereby a required amount of atomsphere is introduced to the vacuum fed from the vacuum pump 20, so that the control vacuum can be modulated.

As detailedly shown in FIG. 4, the thermistor 32 is disposed close to the coil 18D of the vacuum modulating valve 18 and adapted to detect the temperature of the coil 18D effectively.

As detailedly shown in FIG. 5, the ECU 34 comprises:

a central processing unit (hereinafter referred to as an "MPU") 34A formed by a microprocessor for example, for performing various calculating and processing;

a read only memory (hereinafter referred to as a "ROM") 34B for storing a control program, various data and the like;

a random access memory (hereinafter referred to as a "RAM") 34C for provisionally storing calculation data and the like;

an analogue-digital converter (hereinafter referred to as an "A/D converter") 34D having a multiplexer function, for converting analogue signals inputted from the accelerator sensor 28, the coolant temperature sensor 30, the thermistor 32 and the like into digital signals and taking in the same successively;

a first input-output port (hereinafter referred to as an "I/O port") 34E for taking in digital signals outputted from the engine speed sensor 24;

a second I/O port 34F for outputting control signals to the vacuum modulating valve 18, the fuel injection pump 22 and the like in accordance with the result of calculation of the MPU 34A; and a common bus 34G for connecting the respective components to one another.

Description will now be given of action of the embodiment.

Figure 7:
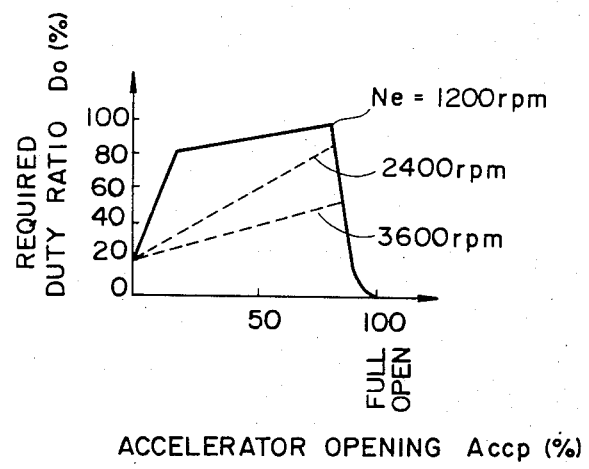
FIG. 7 is a chart showing a map for determining a required duty ratio from the engine speed and the accelerator openings as used in the above flow chart.
Figure 6:
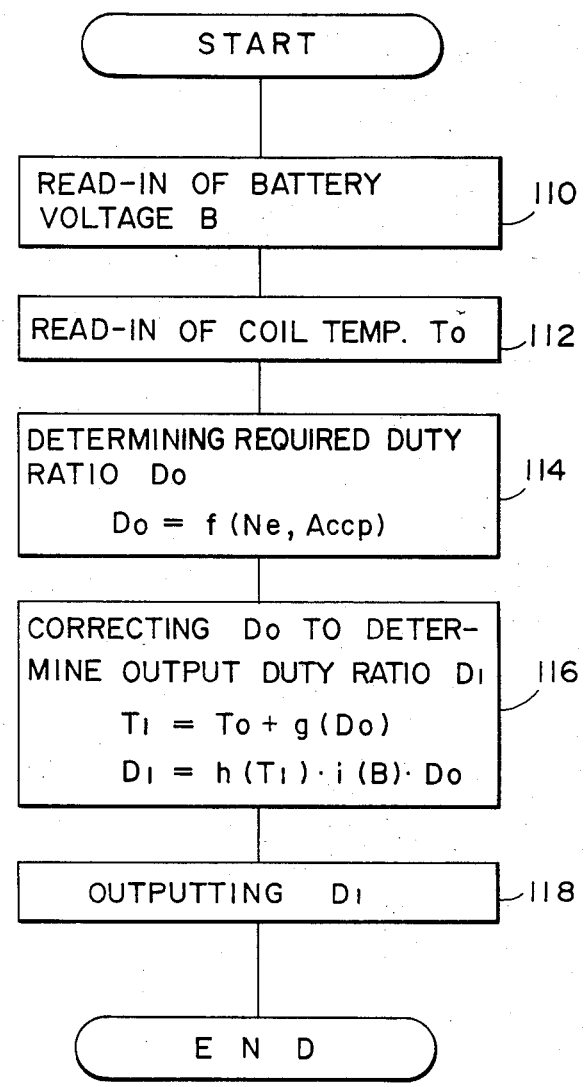
FIG. 6 is a flow chart showing the steps of controlling the vacuum modulating valve used in the above embodiment.

The vacuum modulating valve 18 in this embodiment is controlled in accordance with the flow chart shown in FIG. 6. More specifically, firstly, in Step 110, the voltage B of the battery 33 is read in. Subsequently, in Step 112, the coil temperature $T_0$ of the vacuum modulating valve 18 is read in from the thermistor 32. Subsequently, the routine proceeds to Step 114, where a required duty ratio $D_0$ is determined through the following equation by use of a map such as for example, the one shown in FIG. 7, which is previously stored in the ROM 34B, in accordance with the engine speed Ne determined from outputs of the engine speed sensor 24 and the accelerator openings Accp determined from outputs of the accelerator sensor 28.

$$D_0 = f(Ne, Accp) \quad (1)$$

Figure 8:
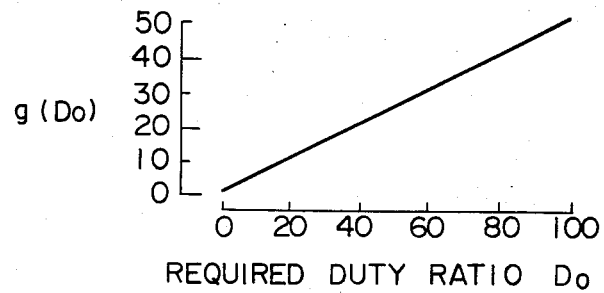
FIG. 8 is a chart showing the relationship between the required duty ratio and a term of correction thereof as used in the above flow chart.

Subsequently, the routine proceeds to Step 116, where the required duty ratio $D_0$ is corrected in accordance with the coil temperature $T_0$, the required duty ratio $D_0$ and the battery voltage B. More specifically, firstly, a term of correction $g(D_0)$ of the required duty ratio is determined by use of the relationship shown in FIG. 8 for example, in accordance with the required duty ratio $D_0$. Subsequently, as shown in the following equation, the term of correction $g(D_0)$ of the required duty ratio is added to the coil temperature $T_0$, to thereby determine a correction temperature $T_1$.

$$T_1 = T_0 + g(D_0) \quad (2)$$

Figure 9:
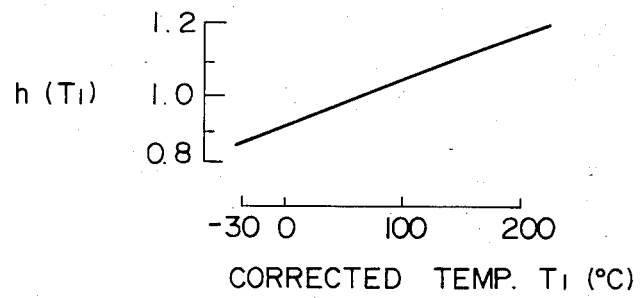
FIG. 9 is a chart showing the relationship between the coil temperature and the correction factor thereof as used in the above flow chart.
Figure 10:
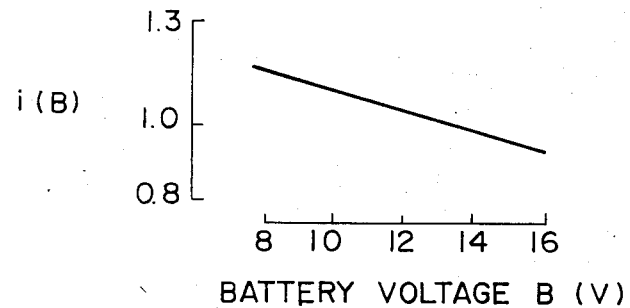
FIG. 10 is a chart showing the relationship between the battery voltage and the correction factor thereof as used in the above flow chart.

Subsequently, the required duty ratio $D_0$ is multiplied by a first correction factor $h(T_1)$ determined by use of the relationship shown in FIG. 9 in accordance with the correction temperature $T_1$ and a second correction factor $i(B)$ determined by use of the relationship shown in FIG. 10 in accordance with the battery voltage B, to thereby determine an output duty ratio $D_1$.

$$D_1 = h(T_1) \cdot i(B) \cdot D_0 \quad (3)$$

Subsequently, the routine proceeds to Step 118, where the output duty ratio $D_1$ determined in Step 116 is outputted to the vacuum modulating valve 18 to thereby complete this routine.

In this embodiment, the required duty ratio is corrected such that, firstly, the coil temperature $T_0$ detected by the thermistor 32 of the vacuum modulating valve 18 is corrected by the required duty ratio $D_0$, and subsequently, the required duty ratio $D_0$ is corrected by the temperature $T_1$ after the correction and the battery voltage B, so that the temperature correction of the vacuum modulating valve 18 can be finely performed. Additionally, the method of correcting the required drive signal of the vacuum modulating valve need not necessarily be limited to this, and the addition of a constant voltage circuit for example makes it possible to omit the correction by the battery voltage B. Furthermore, the type of the drive signal of the vacuum modulating valve need not necessarily limited to a duty signal, and may be any other signal.

Furthermore, in this embodiment, as the temperature detecting element, a small-sized thermistor 32 is used and disposed close to the coil 18D of the vacuum modulating valve 18, whereby the temperature of the coil 18D is detected with high accuracy, so that the temperature correction can be accurately performed. Additionally, the type and the position of provision of the temperature detecting element need not necessarily be limited to those in this embodiment.

What is claimed is:

1. An apparatus for controlling a vacuum modulating valve for exhaust gas recirculation control, incorporating therein a temperature detecting element, wherein said method comprises:

means for detecting an engine speed;

means for detecting an engine load;

means for determining a required drive signal of said vacuum modulating valve in accordance with operating conditions of an engine, including the engine speed and the engine load;

means for correcting said required drive signal in accordance with a temperature of said vacuum modulating valve detected by said temperature detecting element, a battery voltage and a driving level of said required drive signal to obtain a corrected drive signal; and means for driving said vacuum modulating valve in response to the corrected drive signal.

2. An apparatus for controlling a vacuum modulating valve for exhaust gas recirculation control, incorporating therein a temperature detecting element, wherein said apparatus comprises:

means for maintaining a constant voltage from a battery;

means for detecting an engine speed;

means for detecting an engine load;

means for determining a required drive signal of said vacuum modulating valve in accordance with operating conditions of an engine, including the engine speed and the engine load;

means for correcting said required drive signal in accordance with at least a temperature of said vacuum modulating valve detected by said temperature detecting element and a driving level of said required drive signal to obtain a corrected drive signal; and means for driving said vacuum modulating valve in response to the corrected drive signal.

3. A method of controlling a vacuum modulating valve for exhaust gas recirculation control, incorporating therein a temperature detecting element, wherein said method comprises:

a step of determining a required drive signal of said vacuum modulating valve in accordance with operating conditions of an engine, including an engine speed and an engine load;

a step of correcting said required drive signal in accordance with at least a temperature of said vacuum modulating valve detected by said temperature detecting element and a driving level of said required drive signal to obtain a corrected drive signal; and a step of driving said vacuum modulating valve in response to the corrected drive signal.

4. A controlling method as set forth in claim 3, wherein said temperature detecting element is a thermistor disposed close to a coil of said vacuum modulating valve.

5. A controlling method as set forth in claim 3, wherein said drive signal is a duty signal.

6. A controlling method as set forth in claim 3, wherein said required drive signal is determined by use of a map of engine speeds and accelerator openings.

7. A controlling method as set forth in claim 3, wherein said required drive signal is corrected such that, firstly, the detected temperature of said vacuum modulating valve is corrected by the driving level of said required drive signal, and subsequently, said required drive signal is corrected by the corrected temperature and a battery voltage.

8. A controlling method as set forth in claim 7, wherein the correction of the detected temperature by the driving level of said required drive signal is performed such that a term of correction in accordance with said driving level is added to the detected temperature.

9. A controlling method as set forth in claim 7, wherein the correction of the required drive signal by said corrected temperature and said battery voltage is made such that the required drive signal is multiplied by a first correction factor in accordance with said corrected temperature and a second correction factor in accordance with said battery voltage.

* * * * *